United States Patent

[11] 3,548,074

| [72] | Inventors | John Derrick Endacott<br>Chislehurst, England;<br>Michael Savvas Papadopulos, Longfield,<br>Kent, England |
|---|---|---|
| [21] | Appl. No. | 737,244 |
| [22] | Filed | June 14, 1968 |
| [45] | Patented | Dec. 15, 1970 |
| [73] | Assignee | British Insulated Callender's Cables<br>Limited<br>London, England |
| [32] | Priority | June 15, 1967 |
| [33] | | Great Britain |
| [31] | | No. 27585/67 |

[54] METHOD OF AND APPARATUS FOR INSTALLING ELECTRIC POWER CABLES
25 Claims, 4 Drawing Figs.

[52] U.S. Cl...................................................... 174/19,
174/10
[51] Int. Cl....................................................... H02g 15/22
[50] Field of Search........................................... 174/10, 12,
13, 14, 15, 19, 20—25; 29/628; 156/49

[56] References Cited
UNITED STATES PATENTS

| 2,969,415 | 1/1961 | Hartill et al................... | 174/19 |
| 3,444,016 | 5/1969 | Baskwell...................... | 174/24X |

FOREIGN PATENTS

| 1,062,444 | 3/1967 | Great Britain................ | 174/19 |

Primary Examiner—Lewis H. Myers
Assistant Examiner—A. T. Grimley
Attorney—Webb, Burden, Robinson and Webb ABSTRACT: In a method of jointing or terminating an electric power cable of the kind having a hollow conductor through the duct of which a dielectric and/or cooling fluid flows, the conductor duct at an end of the cable is temporarily blocked against undue loss of fluid by inserting a mechanical blocking means into the duct. This may be done in the factory before the end of the cable is capped or on site after the cable has been uncapped before or after the exposed end of the conductor has been prepared for jointing. After a jointing ferrule has been attached to the exposed end of the conductor the blocking means is withdrawn through or into the ferrule to allow the fluid to flow from the duct into and through the ferrule.

PATENTED DEC 15 1970

Inventor
JOHN DERRICK ENDACOTT
MICHAEL SAVVAS PAPADOPULOS
By Webb, Burden,
Robinson & Webb
Attorneys

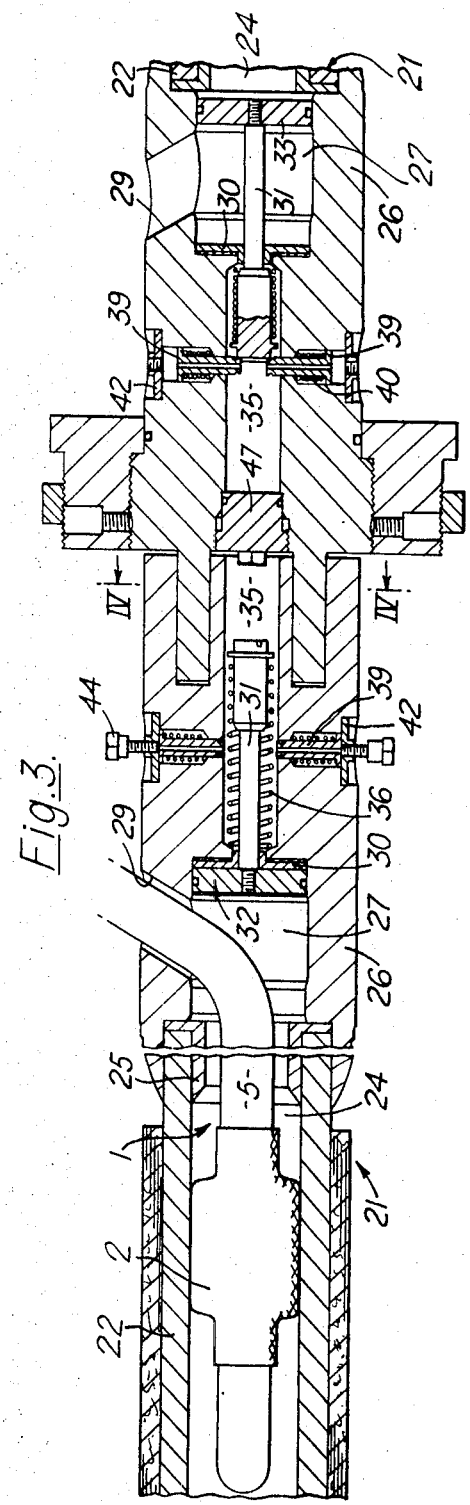
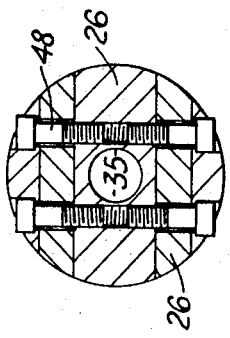

METHOD OF AND APPARATUS FOR INSTALLING ELECTRIC POWER CABLES

This invention relates to jointing and terminating electric power cables of the kind having hollow conductors through which a dielectric and/or cooling fluid flows and has as its object the provision of a method of and apparatus for jointing or terminating such cables without undue loss of fluid from the conductor ducts.

In the method in accordance with the invention, the duct in the hollow cable conductor at an end of a cable is temporarily blocked by a mechanical blocking means that is inserted into the duct either in the factory before said end of the cable has been capped, or on site after said end of the cable has been uncapped and before or after the exposed end of the conductor has been prepared for jointing and, after a jointing ferrule has been attached to the exposed end of the conductor, said blocking means is withdrawn through or into the ferrule to allow the fluid to flow from the duct into and through the ferrule.

The mechanical blocking means may comprise an expansible blocking means which, after it has been inserted into the duct, is caused to expand to block the duct and which, after the ferrule has been attached to the conductor, is caused to contract and is withdrawn through the ferrule. Alternatively the mechanical blocking means may comprise a retractable blocking means which is attached to or is adapted to be attached to operating means carried by or adapted to be carried by the ferrule and which, after the ferrule has been attached to the conductor, is retracted by the operating means into the ferrule.

In the preferred method in accordance with the invention the duct in a hollow cable conductor is blocked successively by two mechanical blocking means, an expansible blocking means that is inserted into the duct before the end of the cable is capped in the factory or after the end of the cable has been uncapped on site and before the end of the conductor is prepared to receive a jointing ferrule, and a retractable blocking means that is adapted to replace the expansible blocking means and to be withdrawn from the conductor duct, or from the orifice of a duct in the ferrule coinciding with the end of the conductor duct, into the ferrule, after the ferrule has been attached to the end of the cable conductor, at an appropriate time when flow of the fluid from the end of the hollow conductor need no longer be restrained.

The expansible blocking means is preferably in the form of a catheter with an expansible end bulb which can be forced a sufficient distance into the cable conductor duct, before the end of the cable has been capped or after the end of the cable has been uncapped, and then expanded by fluid pressure to block the duct and enable the end of the conductor to be trimmed to the required length without substantial loss of fluid from the duct.

The retractable blocking means preferably comprises a plunger which fits into the end of the conductor duct, or into the orifice of a duct in the ferrule coinciding with the end of the conductor duct, and is attached to or adapted to be attached to an operating member carried by or adapted to be carried by the ferrule by which it can subsequently be withdrawn into the ferrule.

The retractable blocking means may comprise a plunger which can be inserted into the end of the conductor duct before the ferrule is attached to the conductor and can then be locked in position by radial expansion, the plunger being provided with an axial operating member that can be linked to the ferrule, or with means to which an axial operating member associated with the ferrule can subsequently be attached, when the ferrule is fitted on to and attached to the end of the conductor. The operation of attaching the operating member to the ferrule or to the plunger preferably releases the means locking the plunger into the end of the conductor duct without affecting its blocking capacity so that subsequent withdrawal of the plunger from the conductor duct can be effected.

Before the jointing ferrule is attached to the conductor a rigid supporting mandrel may be inserted into the end of the duct, especially when the ferrule is to be compression jointed to the conductor, the mandrel preferably being of approximately the same length as the length of the socket part of the ferrule into which the conductor will subsequently be inserted.

The invention includes ferrules for use in the methods described, that is ferrules provided with a central bore leading from the socket into which the conductor fits to a fluid passage or passages and provided with operating means by which a plunger, adapted to block the end of the conductor or the orifice of said bore that coincides with the coincides with the conductor duct, can be withdrawn into a position within the ferrule such that fluid from the conductor duct is permitted to flow into the fluid passage or passages. These passages will normally be transverse passages which extend through the wall of the ferrule bore and through which fluid can flow from the conductor duct to the outside of the ferrule on one side of the barrier of a stop joint but the ferrule can be provided with a passage or passages by which fluid can flow through the ferrule into the duct of another conductor connected thereto, when the plunger is retracted from the conductor duct or the orifice of the bore in the ferrule.

When, for example, the ferrule is of the kind for use in a stop joint and provided with transverse passages through which dielectric fluid can flow from the conductor duct radially outwards through the ferrule wall into a fluid chamber surrounding the ferrule, the plunger may be carried on the end of an elongated operating member which is coaxial with the ferrule and mounted in a bore in a solid part of the ferrule located on the opposite side of the transverse passage or passages from the socket of the ferrule that fits over the end of the cable conductor.

In the case where the ferrule is attached to the exposed end of the conductor after an expansible blocking means has previously been inserted into the end of the conductor duct, the expansible blocking means may be such as to be withdrawn through the transverse passage or one of the transverse passages of the ferrule before the plunger is caused to block the end of the conductor duct or the orifice of the ferrule bore that coincides with the conductor duct.

The solid part of the ferrule may be provided with a recess into which the plunger can subsequently be withdrawn by axial movement of the operating member away from the cable end, for example under the action of a biasing spring which can be actuated from outside the ferrule to cause such movement when the joint or termination has been completed or when it has reached such a stage that flow of the dielectric fluid from the conductor duct through the transverse passage or passages in the ferrule need no longer be restrained.

The invention will now be further illustrated by a description, by way of example and with reference to the accompanying drawings, of three methods of temporarily blocking the large diameter duct of a hollow conductor of an oil-cooled electric cable during jointing or terminating of the cable. In the accompanying drawings:

FIG. 3 is a fragmental sectional view of the conductor joint of a stop joint during manufacture of which the end of each cable conductor is temporarily blocked successively by an expansible blocking means and a retractable blocking means; and FIG. 4 is a section taken on the line IV-IV in FIG. 3.

Figure 1:
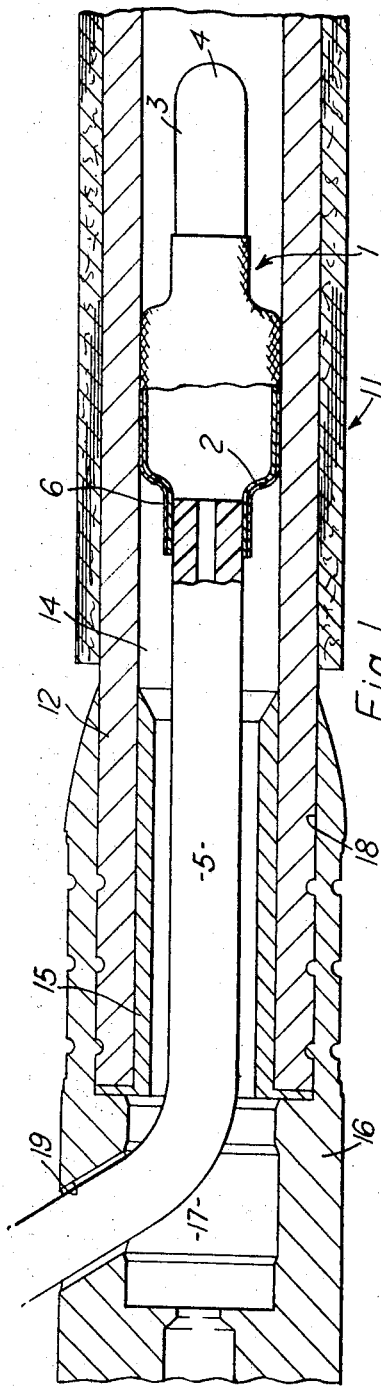
FIG. 1 is a fragmental sectional view of a temporarily blocked end of a cable conductor in which an expansible blocking means is employed.

In the method of temporarily blocking an end of a conductor duct illustrated in FIG. 1 the expansible blocking means employed consists of a catheter 1 comprising a short, thin-walled sleeve 2 of nitrile rubber which at one end is sealed to a short length of relatively stiff tube 3 of the same material closed at the unconnected end by an integral end wall 4 and which at its other end is sealed to one end of a longer length of relatively stiff tube 5 of nitrile rubber. The short sleeve 2 is reinforced by an outer covering 6 of braided terylene fabric.

In effecting the step of temporarily blocking the duct 14 in the hollow conductor 12 at one end of a cable 11 against undue loss of insulating oil which is contained in and is caused to flow through the duct, the catheter 1 is forced wholly into the conductor duct at the factory before the end of the cable is capped. When, on site, it is required to prepare the cable 11 for jointing to another length of the cable, the cable is uncapped to expose the unconnected end of the tube 5 and fluid under pressure is then injected into the tube to cause the sleeve 2 to expand to block the conductor duct 14 and to enable the end of the conductor 12 to be trimmed for jointing without substantial loss of insulating oil from the duct. After the end of the conductor 12 has been trimmed a rigid metal supporting mandrel 15 is threaded over the tube 5 and is inserted into the end of the conductor duct 14, the mandrel having a length that is slightly less than the exposed length of the conductor 12. A jointing ferrule 16 having a central bore 17 leading from a socket 18, into which the exposed end of the conductor 12 is to be fitted, to an oil passage 19 in the wall of the ferrule, is then slipped onto the exposed conductor by threading the ferrule over the tube 5 in such a way that the tube protrudes through the oil passage. The ferrule 16 is then secured to the conductor 12 by compression jointing. At an appropriate time when flow of the oil from the end of the hollow conductor 12 need no longer be restrained the fluid pressure in the sleeve 2 is released to deflate the sleeve and the catheter 1 is withdrawn from the conductor duct 14 through the passage 19 in the ferrule 16.

In a modified method of effecting temporary blocking of a conductor duct using a catheter as shown in FIG. 1, the catheter is forced wholly into the conductor duct at the factory, is inflated by fluid pressure to block the duct and is sealed against loss of fluid pressure before the end of the cable is capped. On site, the cable is uncapped and the end of the conductor trimmed for jointing without substantial loss of insulating oil from the duct. Jointing of the cable and extraction of the catheter is effected in the same way as described with references to FIG. 1.

It will be appreciated that other forms of catheter may be employed. For example, the catheter may consist of an integral tube and bulb of synthetic rubber.

Figure 2:
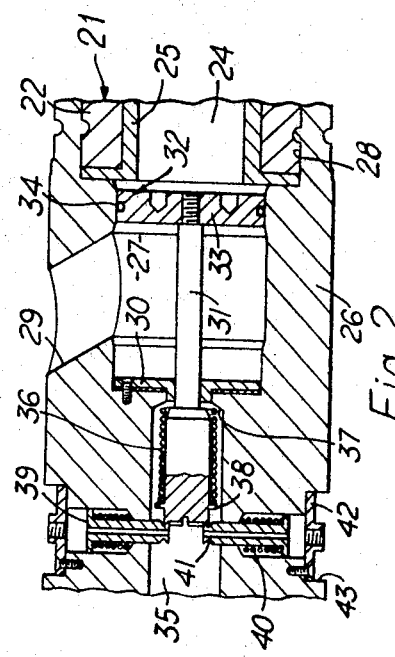
FIG. 2 is a similar view of a temporarily blocked end of a cable conductor in which a retractable blocking means is employed.

In effecting the method of temporarily blocking the conductor duct 24 of the hollow conductor 22 at the end of a cable 21 as shown in FIG. 2 use is made of a special form of ferrule 26. The ferrule has a central bore 27 which leads from a socket 28 into which the conductor 22 is to be fitted to a fluid passage 29 extending through the wall of the ferrule. Secured to the end wall of the central 27 is 153 annular plate 30 having a bore in which is slidably mounted an axially disposed operating rod 31 which carries at one end a plunger 32. The plunger 32, which comprises a rigid disc 33 with a peripheral groove housing a sealing ring 34, is adapted to block the end of the orifice of the bore 27 that will coincide with the conductor duct 24 and the plunger can be withdrawn to a position in which it abuts the annular plate 30 whereby to provide for a free flow of oil from the conductor duct 24 into the central bore 27 and through the oil passage 29 to outside the ferrule. A part of the operating rod 31 extends into an axial bore 35 in the ferrule and carries a coil spring 36, which is located between a shoulder 37 at the entry end of the bore 35 and a peripheral flange 38 on the rod, and under the action of which the plunger 32 is biased in the "open" position, that is in a position in which flow of oil through the oil passage 29 is permitted.

The operating rod 31 is latched, in a position in which the plunger 32 is held in the orifice of the bore 27 to block the flow of oil, by a number of notched radial tubular latches 39, each of which is biased radially outwards by a coil spring 40 but is prevented from such radial outward movement by engagement of its notch 41 with an annular recess on the operating rod. Radial outward movement of each tubular latch 39 is prevented by an annular plate 42 which is secured in a recess 43 in the outer surface of the ferrule. The bore of the annular plate 42 is screw threaded to receive an adjusting screw 44 (FIG. 3) by means of which the tubular latch can be urged radially inwards to cause its notch 41 to engage the annular recess on the operating rod.

When the ferrule 26 is to be employed in jointing the hollow conductor 22 of the cable 21 to the conductor of another cable and in effecting temporary blocking of the conductor duct 24, the cable is uncapped, the cable end trimmed and, after a rigid metal supporting mandrel 25 has been inserted into the conductor duct, the socket 28 of the ferrule is slipped over the exposed end of the conductor and the ferrule is compression jointed thereto. Prior to slipping the ferrule 26 onto the conductor 22 the plunger 32 will have been latched in position in the end of the orifice of the bore 27 by urging the plunger into this position against the action of the coil spring 36 and latching it in this position by urging the latches 39 radially inwards by means of the adjusting screws 44 (FIG. 3) until the notches 41 engage in the annular recess on the operating rod 31. The adjusting screws 44 are then removed. Access to the operating rod 31 in order that it can be urged into this position is provided by the axial bore 35. It will be appreciated that the operating rod 31 is spring biased into contact with the latches 39 in such a way that it is restrained by the latches from further axial movement when the plunger 32 is in the required blocking position in the end of the orifice of the bore 27.

When the building up of the joint structure has reached the stage where the plunger 32 can be released from the orifice of the bore 27, this is effected by applying fluid pressure greater than that within the conductor duct 24 to the plunger through the oil passage 29. This causes the plunger 32 to move a short distance towards the conductor duct 24 to release the notches 41 of the radial latches 39 from the annular recess on the operating rod 31 and allow the latches to move under their biasing springs 40 away from the operating rod. After release of the fluid pressure the operating rod 31 moves axially under the action of its own biasing spring 36 to withdraw the plunger 32 past the oil passage 29 to abut the annular plate 30, where it no longer obstructs oil flow from the conductor duct 24 through the oil passage.

Other means for actuating the biasing spring 36 in order that it can urge the plunger 32 against the annular plate 30, can be used, for example a release cord or Bowden cable.

FIGS. 3 and 4 illustrate a third, and preferred, method of temporarily blocking the duct of a hollow conductor of an oil cooled electric cable in which the catheter described with reference to FIG. 1 and the special form of ferrule described with reference to FIG. 2 are used successively. In the following description, where appropriate, the same references have been used as those used in FIGS. 1 and 2.

FIGS. 3 and 4 illustrate the conductor joint of a stop joint between two lengths of oil cooled electric cable in which use is made of two jointing ferrules in accordance with the present invention. Before being capped in the factory each cable 21 has a catheter 1 inserted into the conductor duct 24 at an end of the cable. On site, and as shown on the left-hand side of FIG. 3, each cable is uncapped, the sleeve 2 of the catheter 1 is caused to expand by fluid pressure to block the duct 24, the end of the cable is trimmed and the ferrule 26 is compression jointed to the exposed end of the conductor 22. All these operations are carried out as described with reference to FIG. 1. Whilst the ferrule 26 is being compression jointed to the exposed end of the conductor 22 the plunger 32 lies in the "open" position abutting the annular plate 30.

After the ferrules 26 have been secured to the end of each conductor 22, the sleeve 2 of the catheter 1 is deflated, the catheter is withdrawn through the oil passage 29 and the plunger 32 is latched in position in the end of the orifice of the bore 27 as shown on the right-hand side of FIG. 3 in the manner described with reference to FIG. 2. With the end of each conductor duct 24 now blocked by a plunger 32 the axial bore 35 of one of the ferrules 26 is blocked by a plug 47 and the two ferrules are electrically connected together by screw 48 (FIG. 4). The stop joint structure is then built up until a stage is reached when it is no longer necessary to restrain the flow of oil from each cable whereupon each plunger 32 is released in the manner described with reference to FIG. 2.

The method of the invention has the advantage of simplicity over the method hitherto used of freezing the oil in the duct of an oil filled cable during jointing, especially when applied to cables for heavy currents having a large diameter duct through which the oil is circulated for cooling purposes.

We claim:

1. In a method of jointing an electric power cable of the kind having a hollow conductor through the duct of which a dielectric fluid flows, the step of temporarily blocking the duct in the hollow conductor at an end of the cable against undue loss of fluid which comprises inserting a mechanical blocking means into the duct, and, after the end of the conductor has been exposed and prepared for jointing and a jointing ferrule has been attached to the exposed end of the conducting, withdrawing said blocking means into the ferrule to allow the fluid to flow from the duct into and through the ferrule.

2. A method as claimed in claim 1, wherein the mechanical blocking means is inserted into the duct in the factory before the end of the cable has been capped.

3. In a method of jointing an electric power cable of the kind having a hollow conductor through the duct of which a dielectric fluid flows, the step of temporarily blocking the duct in the hollow conductor at an end of the cable against undue loss of fluid which comprises inserting an expansible blocking means into the duct causing the expansible blocking means to expand to block the duct and, after the end of the conductor has been exposed and prepared for jointing and a jointing ferrule has been attached to the exposed end of the conductor, causing the expanded blocking means to contract and withdrawing said blocking means into and through the ferrule to allow the fluid to flow from the duct into and through the ferrule.

4. A method as claimed in claim in claim 3, wherein the expansible blocking means is inserted into the duct in the factory before the end of the cable has been capped.

5. A method as claimed in claim 4, wherein the expansible blocking means is caused to expand to block the conductor duct before the end of the cable has been capped.

6. A method as claimed in claim 2, wherein, after the expansible blocking means has been inserted into the conductor duct and before the ferrule has been attached to the exposed end of the conductor, a rigid supporting mandrel is inserted into the end of the conductor duct.

7. A method as claimed in claim 6, wherein the mandrel is of approximately the same length as the length of a socket part of the ferrule into which the conductor is to be inserted and the ferrule is compression jointed to the conductor.

8. A method as claimed in claim 2, wherein the ferrule has a central bore leading from a socket part of the ferrule into which the conductor fits to at least one fluid passage extending transversely through the wall of the ferrule and the expansible blocking means is withdrawn into the ferrule and through the fluid passage.

9. A method as claimed in claim 2, wherein the expansible blocking means is in the form of a catheter with an expansible end bulb which can be forced a sufficient distance into the conductor duct and can then be expanded by fluid pressure to block the duct.

10. A method as claimed in claim 9, wherein the catheter comprises a short sleeve of flexible material which is sealed at one end to a stiff tube closed at its unconnected end and which is sealed at its other end to a longer length of stiff tube through which the sleeve can be inflated.

11. In a method of jointing an electric power cable of the kind having a hollow conductor through the duct of which a dielectric fluid flows, the step of temporarily blocking the duct in the hollow conductor at an end of the cable against undue loss of fluid which comprises moving a retractable blocking means which is attached to operating means carried by a jointing ferrule axially to block the conductor duct and, after the end of the conductor has been exposed and prepared for jointing and the ferrule has been attached to the exposed end of the conductor, retracting said blocking means by the operating means into the ferrule to allow the fluid to flow from the duct into and through the ferrule.

12. A method as claimed in claim 11, wherein a rigid supporting mandrel is inserted into the end of the conductor duct before the retractable blocking means is inserted therein.

13. A method as claimed in claim 12, wherein the mandrel is of approximately the same length as the length of a socket part of the ferrule into which the conductor is to be inserted and the ferrule is compression jointed to the conductor.

14. A method as claimed in claim 11, wherein the ferrule has a duct whose orifice coincides with the end of the conductor duct, the operating means is a coaxially disposed elongated operating member and the retractable blocking means comprises a plunger which is attached to the operating member and fits into the orifice of the conductor duct in the ferrule.

15. A method as claimed in claim 14, wherein retraction of the plunger into the ferrule is effected by axial movement of the operating member, which movement is controlled by a biasing spring which is actuated from outside the ferrule to cause such movement.

16. A method as claimed in claim 15, wherein at least one notched radial latch is mounted in the ferrule and the operating member is spring biased into engagement with the notched latch, which latch is spring biased radially outwards but is prevented from such radially outward movement by engagement of its notch with the operating member, the arrangement being such that after the ferrule has been attached to the exposed end of the conductor the operating member is held in a position in which the plunger is located in the orifice of the ferrule duct and retraction of the plunger is effected by release of the radial latch.

17. A method as claimed in claim 16, wherein release of the radial latch is effected by applying fluid pressure greater than that within the conductor duct to the plunger through at least one transverse passage in the ferrule wall, whereby the plunger moves into the conductor duct to release the notch in the radial latch from the operating member to permit the latch to move radially outward under its biasing spring and, after cessation of the applied fluid pressure, the operating member moves axially under the action of its own biasing spring to withdraw the plunger from the orifice of the ferrule duct, past the transverse passage in the ferrule wall and into a position where it no longer obstructs fluid flow from the conductor duct through the transverse passage.

18. In a method of jointing an electric power cable of the kind having a hollow conductor through the duct of which a dielectric fluid flows, the step of temporarily blocking the duct in the hollow conductor at an end of the cable against undue loss of fluid which comprises inserting an expansible blocking means into the duct causing the expansible blocking means to expand to block the duct, exposing the end of the conductor for jointing, attaching a jointing ferrule to the exposed end of the conductor, said ferrule carrying operating means to which a retractable blocking means is attached, causing the expanded blocking means to contract and withdrawing said blocking means into and through the ferrule, moving the retractable blocking means axially to block the duct and, when flow of fluid from the end of the conductor duct need no longer be restrained, retracting said retractable blocking means by the operating means into the ferrule to allow the fluid to flow from the duct into and through the ferrule.

19. A method as claimed in claim 18, wherein the ferrule has a duct whose orifice coincides with the end of the conductor duct and the retractable blocking means is inserted into the orifice of the ferrule duct.

20. A method as claimed in claim 18, wherein the expansible blocking means is inserted into the duct in the factory before the end of the cable has been capped.

21. For use in jointing an electric power cable of the kind having a hollow conductor through the duct of which a dielectric fluid flows, a jointing ferrule having a central bore which leads from a socket into which the conductor fits to at least one fluid passage, operating means carried by the ferrule, and a plunger attached to the operating means and adapted to block the end of the conductor duct and, when required, to be withdrawn into a position within the ferrule such that fluid from the conductor duct is permitted to flow into the fluid passage.

22. A jointing ferrule as claimed in claim 21, wherein the fluid passage extends transversely from the ferrule bore through the wall of the ferrule to the outside thereof.

23. A jointing ferrule as claimed in claim 22, wherein the operating means comprises an elongated operating member which is coaxial with the ferrule and is mounted in a bore in a solid part of the ferrule located on the opposite side of the transverse passage from the socket into which the conductor fits.

24. A jointing ferrule as claimed in claim 23, wherein a biasing coil spring, carried on the operating member and located between a shoulder in the bore of the ferrule and a flange on the operating member, controls axial movement of the operating member away from the end of the conductor, the biasing spring being adapted to be actuated from outside the ferrule.

25. A jointing ferrule as claimed in claim 24, wherein at least one notched radial latch is mounted in the ferrule and the operating member is spring biased into engagement with the notched latch, which latch is spring biased radially outwards but is prevented from such radially outward movement by engagement of its notch with the operating member, the arrangement being such that after the ferrule has been attached to the exposed end of the conductor the operating member can be held in a position in which the plunger is located in the orifice of the ferrule bore that will coincide with the conductor duct, and retraction of the plunger into the ferrule can be effected by release of the radial latch.